United States Patent Office 3,111,214
Patented Nov. 19, 1963

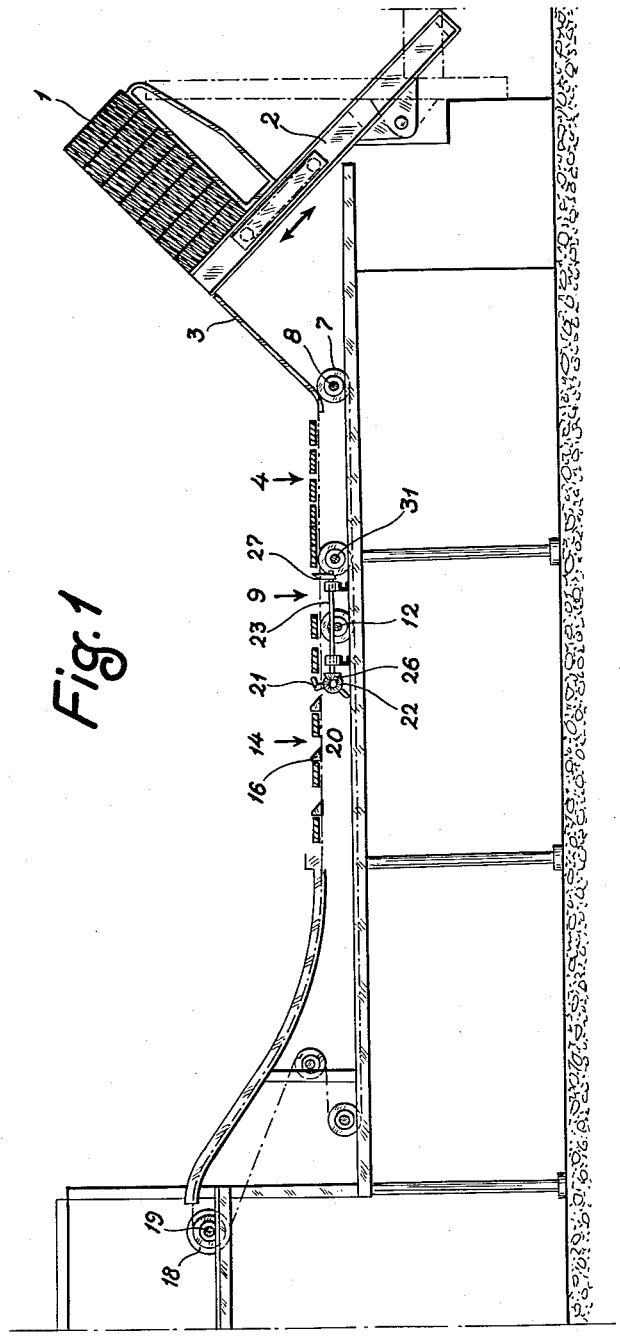

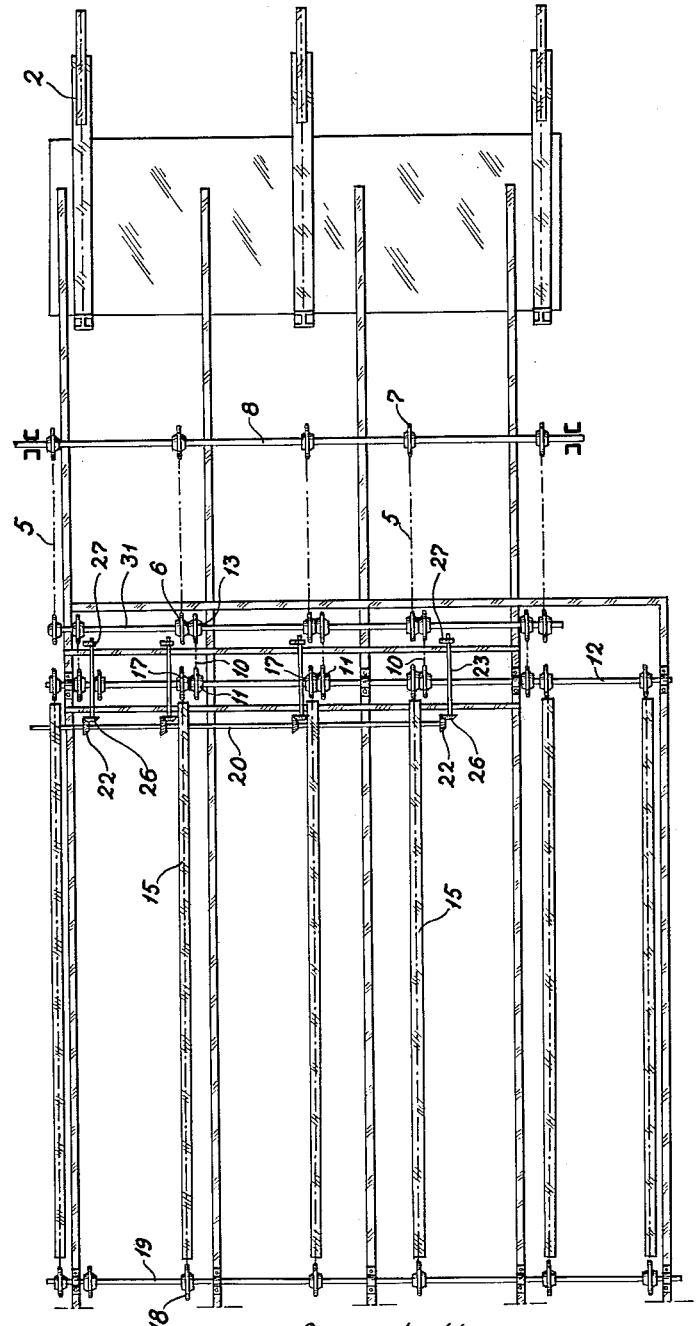

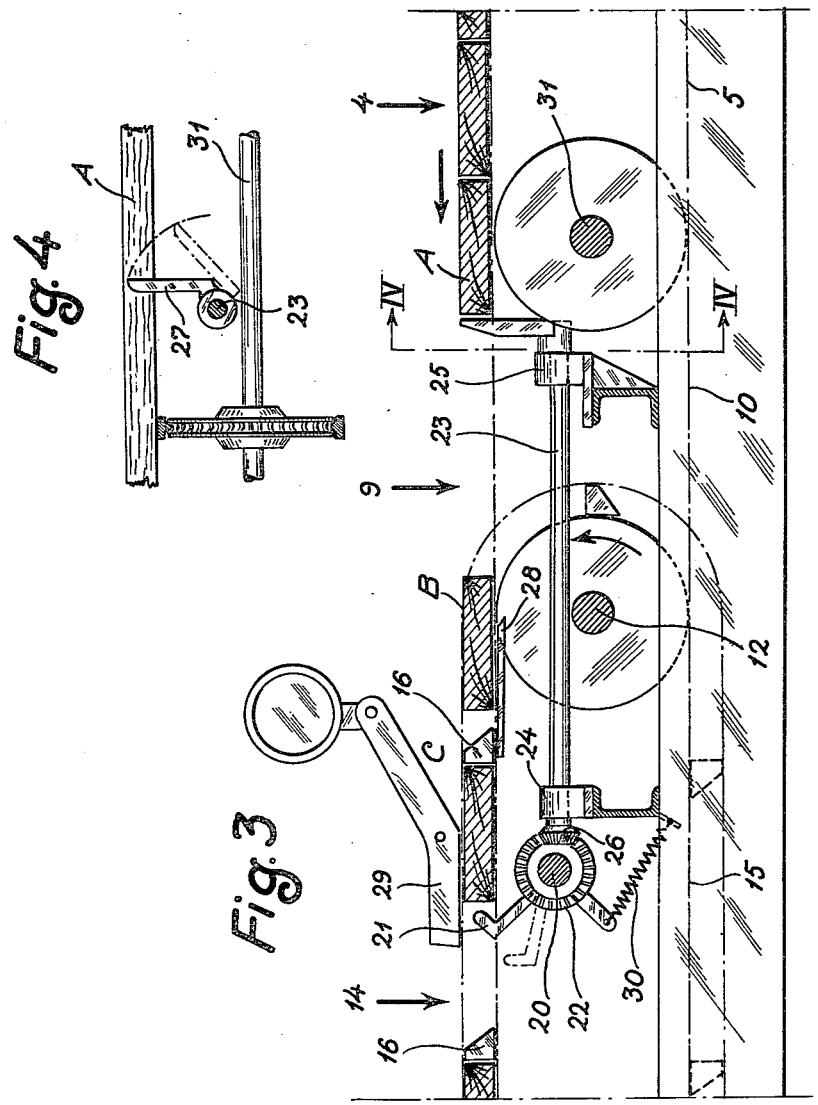

3,111,214
ARRANGEMENT FOR SPACING PIECES OF SAWN TIMBER AT REGULAR INTERVALS ON A CONVEYOR
Olli Lennart Heikinheimo, Kaukas, Finland, assignor to Oy. Kaukas Ab., Kaukas, Finland, a company of Finland
Filed Oct. 31, 1961, Ser. No. 148,982
7 Claims. (Cl. 198—34)

This invention refers to an arrangement for transferring pieces of sawn timber lying in a single layer on a conveyor, principally at right angles to the direction of conveyance but at irregular intervals, on to another conveyor fitted with pusher fingers, in such a way that the intervals between the pieces of timber are of the desired distance and equal along the whole length of the pieces.

It is an object of the invention to provide an arrangement comprising a first conveyor adapted to transport pieces of timber at random intervals, an intermediate conveyor and a last conveyor provided with pusher fingers at selected intervals, said last conveyor travelling at a speed exceeding that of said first conveyor, and said intermediate conveyor travelling at a speed exceeding that of said last conveyor.

It is a further object of the invention to provide an arrangement comprising halting means at the front end of said last conveyor for halting the pieces of timber in succession in the path of travel of the pusher fingers of said last conveyor.

It is a further object of the invention to provide an arrangement comprising at least one feeler means actuated by the travelling pieces of timber, and stop means at the rear end of said first conveyor actuated by said feeler means for the admittance of one piece of timber at a time from said first conveyor on to said intermediate conveyor.

It is a still further object of the invention to provide an arrangement wherein the speed ratio of said first, intermediate and last conveyors is of the order 0.5:1.5:1.

Other details of the invention will become evident from the following description and accompanying drawings, which illustrate one embodiment of it:

FIG. 1 is a side view of a device according to the invention suitable for feeding sawn timber into a piling machine.

FIG. 2 shows a plan view of the same.

FIG. 3 is a side view of a detail of the same, drawn to a larger scale,

FIG. 4 is a cross section along line IV—IV in FIG. 3.

With reference to FIGS. 1 and 2, a pile of sawn planks 1 is shown being placed on a tilting device 2. This tilting device forms no part of the invention and thus it is not described more in detail. Its construction and operation are however believed to be clearly evident from FIG. 1 in which the tilting device 2 is shown in dash-dotted lines in a pile receiving position, and in continuous lines in a plank delivering position. Planks are made to slide, one layer at a time, down a slope 3 on to a first conveyor 4, where they lie in a single layer principally at right angles to the direction of conveyance. In the embodiment presented, the first conveyor 4 is of a normal type formed of several endless chains 5 placed at intervals from each other, the driving pulleys 6 being turned by axle 31 and the idle pulleys 7 revolving around axle 8. In the extension of the first conveyor 4 is an intermediate conveyor 9, having chains 10, the driving pulleys 11 of which are turned by axle 12, while the idle pulleys 13 revolve on axle 6. In the extension of the intermediate conveyor 9 is a last conveyor 14, the chains 15 of which are fitted with pusher fingers 16. The idle pulleys 17 of conveyor 14 revolve on axle 12, the driving pulleys 18 being turned by axle 19. The last conveyor 14 is driven at a higher speed than the first conveyor 4, and the intermediate conveyor 9 is driven at a higher speed than the last conveyor 14, the speed ratio between said first, intermediate and last conveyors 4, 9 and 14 respectively being roughly 0.5:1.5:1.

Near the front end of the last conveyor 14 is a transverse axle 20 to which are attached at intervals along it several approximately hook-shaped feelers 21 and bevel gears 22. At the point of each bevel gear 22 is an axle 23 lying at right angles to axle 20 and turning in bearings 24 and 25 in the frame of the conveyor. Axles 23 extend backward to near the rear end of the first conveyor 4. At the rear end of axles 23 are bevel gears 26 which mesh with bevel gears 22, and at the front end holding pieces or stops 27 which halt the first plank to come on to the conveyor 4 and make it lie at right angles to the direction of conveyance. Near the front end of the last conveyor 14 is a transverse ledge 28 which is placed in the extension of the intermediate conveyor 9 and slightly inclined so as to bring a piece of timber delivered by conveyor 9 to a halt. Near the front end of the last conveyor 14 and above it is further installed a weight device 29 (FIG. 3) which presses crooked planks down on to the conveyor.

The operation of the embodiment shown will now be described with reference to FIG. 3 which shows one stage of the continuous operation. In FIG. 3 some planks are seen lying adjacent to each other, principally at right angles to the direction of conveyance, behind the stops 27 at the rear end of the first conveyor 4, one plank B is lying stationary on the ledge 28 at the front of the last conveyor 14, and one plank C has been taken up by one set of pusher fingers 16 on the last conveyor 14 and is about to actuate the feelers 21. When this plank C presses the feelers 21 down into the position shown by the dotted line in FIG. 3 the axle 20 turns and with it turns the bevel gears 22. These mesh with bevel gears 26, which cause axles 23 to revolve thereby turning the stops 27 until their upper ends lie below the upper plane of the first and intermediate conveyors 4 and 9 respectively to the position shown in dash-dotted lines in FIG. 4. The stops 27 remain down as long as plank C is pressing on the feelers 21. The plank A shown behind the stops 27 in FIG. 3 then moves ahead and because about half of its width is on the intermediate conveyor 9, which moves at one and a half times the speed of the last conveyor 14, the intermediate conveyor 9 takes it rapidly on to the ledge 28 in front of the last conveyor 14. In the meantime plank B has been taken up by the next set of pusher fingers 16 on the last conveyor 14. Plank A remains on ledge 28 until it in its turn is taken on by a set of pusher fingers 16 on the last conveyor 14. Once plank C has moved over the feelers 11, these are released, and returned to their original position by a spring 30 or a counterweight. This causes axle 20 to revolve in the opposite direction, which actuates the bevel gears 22 and 26 and axles 23, thus returning the stops 27 to their holding position. Since the speed of the first conveyor 4 is only about half that of the last conveyor 14, the stops 27 can turn upwards well in time to prevent the next plank on the first conveyor 4 from moving on to the intermediate conveyor 9.

Naturally, the invention is not limited to the embodiment shown and described. There is room for considerable variety of detail within the scope of the claims, especially as regards the design of the machinery via which the movement of the feelers is transmitted to the stops.

What I claim is:
1. In a conveyor arrangement for transporting pieces of sawn timber in a single layer at substantially right angles to the direction of conveyance, a first conveyor adapted to transport pieces of timber at random intervals and having a rear end, an intermediate conveyor having a front end adjacent the rear end of said first conveyor and a rear end, a last conveyor having a front end adjacent the rear end of said intermediate conveyor and being provided with pusher fingers at selected intervals, said last conveyor travelling at a speed exceeding that of said first conveyor, and said intermediate conveyor travelling at a speed exceeding that of said last conveyor, halting means at the front end of said last conveyor for halting said pieces of timber in succession in the path of travel of the pusher fingers of said last conveyor, at least one feeler means actuated by the travelling pieces of timber, and stop means at the rear end of said first conveyor actuated by said feeler means for the admittance of one piece of timber at a time from said first conveyor on to said intermediate conveyor.

2. An arrangement as in claim 1, wherein the speed ratio of said first, intermediate and last conveyors is of the order 0.5:1.5:1.

3. An arrangement as in claim 1, wherein said halting means consist of a ledge extending transversally with respect to the direction of conveyance.

4. An arrangement as in claim 1, wherein said feeler means consist of a plurality of levers attached to a common turnably mounted axle extending transversely with respect to the direction of conveyance, and having free ends extending into the path of travel of said pieces of timber on said last conveyor.

5. In a conveyor arrangement for transporting pieces of sawn timber in a single layer at substantially right angles to the direction of conveyance, a first conveyor adapted to transport pieces of timber at random intervals and having a rear end, an intermediate conveyor having a front end adjacent the rear end of said first conveyor and a rear end, a last conveyor having a front end adjacent the rear end of said intermediate conveyor and being provided with pusher fingers at selected intervals, said last conveyor travelling at a speed exceeding that of said first conveyor, and said intermediate conveyor travelling at a speed exceeding that of said last conveyor, halting means at the front end of said last conveyor for halting said pieces of timber in succession in the path of travel of the pusher fingers of said last conveyor, a plurality of levers attached to a common turably mounted axle extending transversally with respect to the direction of conveyance, and having free ends extending into the path of travel of said pieces of timber on said last conveyor, turnably mounted stop means at the rear end of said first conveyor, and transmission means connecting said levers to said stop means.

6. An arrangement as in claim 5, wherein said transmission means comprise a plurality of turnably mounted axles each carrying one of said stop means and having one end adjacent to said transversally extending axle, a first bevel gear on said end, and a second bevel gear on said transversely extending axle meshing with said first bevel gear.

7. An arrangement as in claim 5, wherein lever returning means are provided for the returning of said levers to their original positions upon displacement by said pieces of timber.

References Cited in the file of this patent
UNITED STATES PATENTS
2,816,647     Ruth _____ Dec. 17, 1957